United States Patent Office 2,965,690
Patented Dec. 20, 1960

2,965,690
ELECTRICAL CAPACITORS
Raymond C. Petersen and Sidney D. Ross, Williamstown, and Manuel Finkelstein, North Adams, Mass., assignors to Sprague Electric Company, North Adams, Mass., a corporation of Massachusetts No Drawing. Filed Jan. 10, 1958, Ser. No. 708,058

6 Claims. (Cl. 317—230)

This invention relates to electrolytic capacitors and more particularly to electrolyte systems for electrolytic capacitors.

As is well known to the art, electrolytic capacitors comprise an anode of a so-called valve metal which is coated with a relatively dense oxide film which is in contact with an electrolyte. In general, any member of that class of metals which is capable of electrolytically forming a dielectric coating when made the anode in an electrolytic solution, and which has an oxide of substantially similar density to its own density, may be considered to be a valve metal capable of use as an anode in an electrolytic capacitor. Practical limitations of cost, availability in high purity, and the availability of readily reducible electrolytes capable of reforming breaks in the oxide film have restricted the valve metals which are utilized in present day electrolytic capacitors to aluminum, tantalum, niobium, and combinations thereof. Of these metals, aluminum is the most popular, because of relatively low cost, availability in uniform high purity, and relative facility of reformation.

Prior art electrolytes for aluminum electrolytic capacitors have unsatisfactory low-temperature operating limits because of low conductivity and high freezing points, which result in a loss of capacity and an increase in dissipation factor and impedance. At high temperatures the prior art electrolytes are limited primarily by low boiling points, which cause evaporation of the electrolyte solvent, which in turn causes decreased capacity and increased dissipation factor and impedance.

Those skilled in the art will recognize that an electrolyte solvent should have properties which permit the electrolyte to maintain operable conductivity at low temperatures. Such a solvent should have a low freezing point and a high boiling point, to provide a wide operating range. Such a solvent should also have a high dielectric constant to ensure a high degree of conductivity by the ability to dissociate salts. A further requirement for a suitable solvent is that it be chemically neutral, so as to prevent corrosion of the electrode and dielectric materials.

Notwithstanding the recognition of the need for a solvent having the above recited properties, prior art attempts at producing such a solvent have met with little success. Ethylene glycol, which is presently the most commonly used solvent, has a temperature range of unsatisfactory breadth. Attempts to alter this solvent by adding water, ethanol, and similar materials to improve the low temperature properties have resulted in lowering the high temperature limit and have increased the corrosion problem. Utilization of higher boiling glycols and triols to raise the high temperature limit have resulted in damage to the low temperature properties. The use of N,N dimethylformamide as a solvent has met with some degree of success in capacitors employing valve metals other than aluminum, but this compound and others chemically similar to it (i.e., other amides and alkyl substituted amides) have boiling points lower than that of ethylene glycol.

It is an object of this invention to provide an electrolytic capacitor capable of stable operation over an extended temperature range.

It is a further object of this invention to provide an electrolyte system for electrolytic capacitors which will extend the operating temperature range of aluminum capacitors.

It is a further object of this invention to provide a solvent for electrolytic capacitors which has a low freezing point, high boiling point, and a high dielectric constant.

These and other objects of this invention, as will become apparent from the following description and claims, have been attained by an electrolytic capacitor employing an electrolyte having a solvent which is a member of the group of five membered ring compounds in which oxygen is a ring member, and containing at least one double bond oxygen attached to one carbon atom of the ring, with or without additional substituents.

These compounds may be used as solvents with any of a number of ionizable solutes, and furthermore may be used in combination with one or more other solvents.

Present indications are that propylene carbonate is the best of these materials for general use as a solvent in electrolytic condensers and the subsequent discussion will be largely concerned with this compound. Propylene carbonate and structurally similar materials have experienced but little, if any, use as electrolyte solvents for any purpose whatsoever, hence they are not normally thought of as electrolyte solvents. However, several salts have been prepared which are quite soluble in propylene carbonate and similar materials and the resulting solutions are highly conducting. Soluble salts include a wide variety of substituted ammonium salts. For example, benzyl triethyl ammonium chloride and phenyl dimethyl allyl ammonium iodide are quite soluble, and in general substituted ammonium salts can be made with desired solubility characteristics by selection of the proper organic substituents. Ammonium and substituted ammonium salts are commonly used in electrolytic capacitors, with various borates and phosphates preferred for use with aluminum anodes and a wider variety finding common usage with tantalum anodes.

Extensive investigations have been carried out using an electrolyte consisting of the polyphosphate salt prepared from triethylamine, phosphorus pentoxide and methanol and dissolved in propylene carbonate. This solution was used to oxidize both aluminum and tantalum foils to 200 volts and in a separate test it was used to age a previously oxidized aluminum foil at 450 volts.

A set of five miniature aluminum electrolytic capacitors was constructed using this electrolyte. These condensers were of 50 volt rating and were made with etched anode foil. The capacities and equivalent series resistance-capacity products were measured for these capacitors at both room temperature and at $-55°$ C. at a frequency of 120 c.p.s. The results of these measurements are listed in Table I.

Table I

| Capacitor Number | Room Temperature | | $-55°$ C. | | Percent Capacity Decrease at $-55°$ C. | Percent Impedance Increase at $-55°$ C. |
|---|---|---|---|---|---|---|
| | Cap. ($\mu$f.) | RC ($\Omega$–$\mu$f.) | Cap. ($\mu$f.) | RC ($\Omega$–$\mu$f.) | | |
| 1 | 5.5767 | 48.6 | 4.216 | 798 | 24.3 | 54.2 |
| 2 | 5.692 | 48.0 | 4.325 | 815 | 24.0 | 54.5 |
| 3 | 5.505 | 61.5 | 4.060 | 848 | 26.2 | 61.0 |
| 4 | 5.519 | 47.7 | 4.198 | 804 | 23.9 | 53.8 |
| 5 | 5.478 | 53.6 | 4.172 | 860 | 23.8 | 56.6 |

These results are remarkable for aluminum electrolytic capacitors which are not ordinarily capable of operating at low temperatures without being heavily doped with water. Another set of five similar capacitors (having more highly etched anode foil and double the capacity of the preceding set) was given the standard life test for this type of miniature unit (rated voltage applied continuously at 65° C.). Some results of this test are shown in Table II.

Table II

| Capacitor Number | 168 Hours | | | 1,000 Hours | | |
|---|---|---|---|---|---|---|
| | Cap. ($\mu f.$) | RC ($\Omega-\mu f.$) | Leakage Current ($\mu$Amp.) | Cap. ($\mu f.$) | RC ($\Omega-\mu f.$) | Leakage Current ($\mu$Amp.) |
| 1 | 12.7 | 201 | 0.5 | 12.3 | 170 | 0.5 |
| 2 | 12.4 | 200 | 0.5 | 12.0 | 170 | 0.5 |
| 3 | 12.6 | 196 | 0.5 | 12.3 | 175 | 0.5 |
| 4 | 12.6 | 200 | 0.5 | 12.1 | 170 | 0.5 |
| 5 | 12.6 | 212 | 0.5 | 12.2 | 180 | 0.5 |

This is evidence of remarkable stability under operating conditions. Three of these capacitors were then allowed to stand at room temperature for 12 weeks without voltage applied, and at the end of this time no increase in leakage current was observed. This test indicates excellent shelf stability.

No high temperature tests were conducted since other factors in present electrolytic capacitor design do not make it possible even to approach the boiling point of this electrolyte.

The solvents described herein are especially valuable for use with aluminum because of the more stringent requirements which must be placed on electrolytes used with aluminum, but they are also perfectly applicable to electrolytic condensers containing anodes of tantalum or other metals.

The present disclosure is concerned with a group of structurally similar materials having exceptionally large liquid ranges (i.e., low freezing point and high boiling point) and having high dielectric constants, which have been demonstrated to be satisfactory solvents for electrolytic condensers. Table III compares propylene carbonate and two other suitable members of this group with ethylene glycol.

Table III

| | M.P., °C. | B.P., °C. | Dielectric constant |
|---|---|---|---|
| Ethylene Glycol | −17 | 197 | 37 |
| Propylene Carbonate | −49 | 242 | 65 |
| γ-Valerolactone | −31 | 206 | 48 |
| Butyrolactone | −42 | 206 | 43 |

These three compounds all have lower melting points, higher boiling points and higher dielectric constants than ethylene glycol. Following are the structural formulae of these three compounds, in which many similarities are evident:

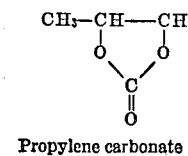
Propylene carbonate

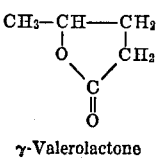
γ-Valerolactone

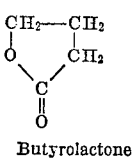
Butyrolactone

These compounds are characterized by a five-membered ring having an O as a ring member and with a =O attached to one of the ring carbons. It should also be emphasized that a large measure of the improvement obtainable by the use of such a solvent material may also be achieved by the use of a mixture of two or more solvent materials, one of which is a member of the group defined above. This may be true in some cases even though the herein defined material is present only in small amounts, since the freezing point of a material may be sharply lowered by the addition of small amounts of another material. This freezing point depression is especially marked when the added material has a high dielectric constant and a low freezing point.

What is claimed is:

1. An electrolytic capacitor electrolyte consisting essentially of a substituted ammonium salt dissolved in a solvent consisting essentially of a member selected from the group consisting of propylene carbonate, gamma-valerolactone, and butyrolactone.

2. An electrolytic capacitor comprising a formed anode electrode, a cathode contact electrode, and a liquid electrolyte in contact with said electrodes, said electrolyte consisting essentially of a substituted ammonium salt dissolved in a solvent consisting essentially of a member selected from the group consisting of propylene carbonate, gamma-valerolactone, and butyrolactone.

3. An electrolytic capacitor as set forth in claim 2, wherein the solvent consists essentially of propylene carbonate.

4. An electrolytic capacitor as set forth in claim 2, wherein the solvent consists essentially of gamma-valerolactone.

5. An electrolytic capacitor as set forth in claim 2, wherein the solvent consists essentially of butyrolactone.

6. An electrolytic capacitor electrolyte consisting essentially of a salt of a condensed alkyl phosphate dissolved in propylene carbonate.

References Cited in the file of this patent

UNITED STATES PATENTS

| 1,270,784 | Chubb | July 2, 1918 |
| 1,829,178 | Yngve | Oct. 27, 1931 |
| 1,907,891 | Steimmig et al. | May 9, 1933 |
| 1,998,202 | Robinson | Apr. 16, 1935 |
| 2,894,957 | Anderson et al. | July 14, 1959 |

OTHER REFERENCES

Carothers et al.: "Studies on Polymerization and Ring Formation III Glycol Esters of Carbonic Acid," J. Am. Chem. Soc., vol. 52, January 8, 1930, pp. 314–326, p. 314 relied on.

"Ethylene Carbonate and Propylene Carbonate," technical information published by Carbide and Carbon Chemicals, F-8307A, 7 p., March 1957.